US006831904B1

(12) United States Patent
Yamao et al.

(10) Patent No.: US 6,831,904 B1
(45) Date of Patent: Dec. 14, 2004

(54) CLUSTER STRUCTURED MOBILE COMMUNICATION SYSTEM BASE STATION, CLUSTER CONTROL STATION, LINE CONTROL STATION AND MOBILE STATION

(75) Inventors: Yasushi Yamao, Yokosuka (JP); Hirohito Suda, Yokosuka (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 662 days.

(21) Appl. No.: 09/626,541

(22) Filed: Jul. 26, 2000

(30) Foreign Application Priority Data

Jul. 28, 1999 (JP) .......................................... 11-214180

(51) Int. Cl.⁷ ............................................... H04Q 7/00
(52) U.S. Cl. ..................................... 370/331; 370/338
(58) Field of Search ................................. 370/328, 331, 370/338, 401; 455/422.1, 426.1, 426.2, 436, 445

(56) References Cited

U.S. PATENT DOCUMENTS

| | | | | |
|---|---|---|---|---|
| 5,210,753 A | * | 5/1993 | Natarajan | 370/338 |
| 5,408,514 A | | 4/1995 | Sakamoto et al. | |
| 5,418,838 A | * | 5/1995 | Havermans et al. | 455/465 |
| 5,539,749 A | * | 7/1996 | Eul | 370/331 |
| 5,649,291 A | | 7/1997 | Tayloe | |
| 5,978,365 A | * | 11/1999 | Yi | 370/331 |
| 5,999,522 A | * | 12/1999 | Rohani | 370/331 |
| 6,009,328 A | | 12/1999 | Muszynski | |
| 6,078,817 A | * | 6/2000 | Rahman | 455/452.1 |
| 6,147,986 A | * | 11/2000 | Orsic | 370/349 |
| 6,252,862 B1 | * | 6/2001 | Sauer et al. | 370/331 |
| 6,349,091 B1 | * | 2/2002 | Li | 370/238 |
| 6,510,153 B1 | * | 1/2003 | Inoue et al. | 370/354 |
| 6,553,011 B1 | * | 4/2003 | Yan et al. | 370/328 |

FOREIGN PATENT DOCUMENTS

| | | | |
|---|---|---|---|
| EP | 0 800 321 | 10/1997 | |
| JP | 1-272329 | 10/1989 | |
| JP | 5-55988 | 3/1993 | |
| JP | 9-23466 | 1/1997 | |
| JP | 9-149451 | 6/1997 | |
| JP | 9-505948 | 6/1997 | |
| JP | 09-200846 | 7/1997 | |
| JP | 11-196461 | 7/1999 | |
| WO | WO 9414289 A1 * | 6/1994 | ............ H04Q/7/04 |
| WO | WO 9532591 A1 * | 11/1995 | ............ H04Q/7/36 |
| WO | WO 99/37112 | 7/1999 | |

OTHER PUBLICATIONS

Wang, Li–Chun. "A New Cellular Architecture Based on an Interleaved Cluster Concept". IEEE Transactions on Vehicular Technology. Nov. 1999. vol. 48. iss. 6. pp. 1809–1818.*
Kim, Dongkyun et al. "Cluster–Based Dynamic Source Routing Protocol in Wireless Ad–Hoc Packet Radio Network with Variabl Sized Clusters and Variable Transmission Ranges". Vehicular Technology Conference, IEEE. May 16–20, 1999. vol. 3. pp. 2441–2445.*

* cited by examiner

*Primary Examiner*—Chau Nguyen
*Assistant Examiner*—Donald L Mills
(74) *Attorney, Agent, or Firm*—Oblon, Spivak, McClelland, Maier & Neustadt, P.C.

(57) ABSTRACT

A mobile communication system includes a line control station, and a plurality of base stations belonging to a plurality of clusters so that each of the clusters includes a plurality of base stations. Each of the clusters includes a cluster control station which is connected to the line control station via a line and controls the base stations within the cluster to which the cluster control station belongs. In addition, each of the base stations within one cluster is connected to other base stations within the one cluster and/or the cluster control station within the one cluster via lines, so that each of the base stations within the one cluster is directly or indirectly connected to the cluster control station within the one cluster.

20 Claims, 6 Drawing Sheets

CLUSTER STRUCTURED MOBILE COMMUNICATION SYSTEM BASE STATION, CLUSTER CONTROL STATION, LINE CONTROL STATION AND MOBILE STATION

BACKGROUND OF THE INVENTION

This application claims the benefit of a Japanese Patent Application No.11-214180 filed Jul. 28, 1999, in the Japanese Patent Office, the disclosure of which is hereby incorporated by reference.

1. Field of the Invention

The present invention relates to a mobile communication system having a line control station and a plurality of clustered base stations, a base station for such a mobile communication system, a cluster control station, a line control station, and a mobile station.

2. Description of the Related Art

FIG. 1 is a diagram for explaining an example of a conventional mobile communication system. The mobile communication system shown in FIG. 1 includes a mobile station (MS) 10, base stations (BSs) $11_1$ through $11_7$, a line control station (RNC: Routing Network Controller) 12, and a mobile communication switching station (MSC: Mobile Switching Center) 13.

The mobile communication switching station 13 is a switching station designed for a mobile communication network. Lines of this mobile communication switching station 13 are connected to another mobile communication switching station or a switching station of a fixed network such as a Public Switched Telephone Network (PSTN). In the case where the mobile communication switching station 13 is a third generation type, the mobile communication switching station 13 not only supports the circuit switching functions, but also supports packet switching functions, which enables connection to the Internet.

The line control station 12 is connected to the mobile communication switching station 13, and to the plurality of base stations $11_1$ through $11_7$. When a communication request is generated, the line control station 12 controls the allocation of radio channels used by the base stations $11_1$ through $11_7$, the start and end of the communication, and the like. In addition, the line control station 12 carries out a handover control when the mobile station 10 moves among the coverage areas of the base stations $11_1$ through $11_7$.

The base stations $11_1$ through $11_7$ are connected to the line control station 12, and carry out radio communication with a plurality of mobile stations 10 under the control of the line control station 12. Various kinds of radio signal protocols (air interfaces), such as the Frequency Division Multiple Access (FDMA), Time Division Multiple Access (TDMA) and Code Division Multiple Access (CDMA), may be employed between the base station and the mobile station.

When making a communication with one mobile station 10 in the mobile communication system shown in FIG. 1, radio signals are basically exchanged directly (peer-to-peer) between the mobile station 10 and the base station which is located near the mobile station 10. In the particular case shown in FIG. 1, the base station $11_2$ is close to the one mobile station 10 which is shown. Accordingly, the signals from the mobile station 10 are sent to the mobile communication switching station 13 via the base station $11_2$ and the line control station 12. When the mobile station 10 moves from the location near the base station $11_2$ towards a location near the base station $11_3$ as shown in FIG. 1, the handover is made from the base station $11_2$ to the base station $11_3$ in order to continue the communication. In other words, the line control station 12 controls the base stations so as to change the base station which is used for the communication with the mobile station 10 from the base station $11_2$ to the base station $11_3$, and also switches the line to the base station from the base station $11_2$ to the base station $11_3$. In FIG. 1, a solid line arrow pointing in two directions indicates a normal communication, and a dotted line arrows pointing in two directions indicates a handover communication.

In the case of a microcell mobile communication system in which an area covered by one base station is small, the handover among the base stations occur frequently when the mobile station 10 carries out the communication while moving at a high speed. As a result, the load on the line control station 12 which carries out the necessary control increases considerably in this case, and there is a problem in that it is difficult to appropriately control and carry out the handover.

On the other hand, in a vicinity of a boundary between two adjacent base stations, the electric field intensity decreases and an error may be generated in the received signals. Consequently, the handover may not be carried out smoothly, and the handover may fail, thereby causing a problem particularly in the microcell mobile communication system in which the handover occurs frequently.

In order to eliminate the latter problem, the CDMA mobile communication system employs the diversity handover technique. According to the diversity handover technique, the mobile station 10 during the handover simultaneously exchanges radio signals with the present base station $11_2$ and the next base station $11_3$ which is to take over, so that even if the signal level exchanged between the mobile station 10 and one of the base stations 112 and $11_3$ decreases and the signal error is generated, the signals exchanged between the mobile station 10 and the other of the base stations $11_2$ and $11_3$ are used for the communication to realize a smooth handover. In this case, in addition to the load caused by the handover control, the line control station 12 must bear the load of the diversity process. Hence, the load on the line control station 12 increases considerably due to the diversity process.

Furthermore, in order to more effectively obtain the diversity effects, it is necessary to transfer to the line control station 12 information related to soft decisions made on the received signals, and information related to the electric field intensity of the received signals. As a result, the amount of information exchanged between the base station and the line control station increases considerably, and there is a problem in that it is necessary to use a line having a large capacity.

The diversity handover is not limited between two base stations, and in some cases, the diversity effects are greater when the diversity handover is carried out among three or more base stations. In addition, the diversity handover can effectively improve the quality of the communication by being carried out not only during the handover, but also when the electric field intensity of the received signals decreases when the mobile station enters within a building, for example. However, the load on the line control station and the load on the line capacity between the base station and the line control station further increases in such cases, thereby making it difficult to realize such a diversity handover in the conventional mobile communication system. Therefore, there was a limit to improving the quality of the communication in the conventional mobile communication system.

SUMMARY OF THE INVENTION

Accordingly, it is a general object of the present invention to provide a novel and useful mobile communication system, a base station, a cluster control station, a line control station, and a mobile station, in which the problems described above are eliminated.

Another and more specific object of the present invention is to provide mobile communication system, a base station, a cluster control station, a line control station, and a mobile station, which can improve the quality of the communication, reduce the load on the line control station and the line between the base station and the line control station, and carry out a distributed autonomous process in the base station, so that an efficient mobile communication system can be realized.

Still another object of the present invention is to provide a mobile communication system comprising a line control station, and a plurality of base stations belonging to a plurality of clusters so that each of the clusters includes a plurality of base stations, wherein each of the clusters includes a cluster control station which is connected to the line control station via a line and controls the base stations within the cluster to which the cluster control station belongs, and each of the base stations within one cluster is connected to other base stations within the one cluster and/or the cluster control station within the one cluster via lines, so that each of the base stations within the one cluster is directly or indirectly connected to the cluster control station within the one cluster. According to the mobile communication system of the present invention, it is possible to improve the communication quality, and reduce the load on the line control station and the load on the line between the line control station and the base station. In addition, it is possible to realize an efficient mobile communication system, by the distributed autonomous process carried out by the base station.

In the mobile communication system, connections within each of the clusters may be made by high-speed cable lines or high-speed radio lines.

In the mobile communication system, the cluster control station and each of the base stations within a single cluster may be connected via a loop network or a bus network.

In the mobile communication system, Internet Protocol (IP) may used as a communication protocol on the lines within each of the clusters. In this case, it is possible to efficiently build a local area network (LAN) within the cluster.

In the mobile communication system, a plurality of the base stations may simultaneously send signals with respect to a single mobile station. In this case, a site diversity transmission becomes possible with respect to the mobile station.

In the mobile communication system, a plurality of the base stations may simultaneously receive signals sent from a single mobile station. In this case, a site diversity reception becomes possible at the base stations.

In the mobile communication system, the plurality of clusters may be mutually connected via lines. In addition, the line control station may connect corresponding cluster control stations within the plurality of clusters via the lines. In this case, the information exchanged between mobile stations can take a bypass route around the line control station, to thereby reduce the load on the line control station.

A further object of the present invention is to provide a cluster control station for controlling a plurality of base stations within one cluster to which the cluster control station belongs, in a mobile communication system which includes a line control station and a plurality of clusters, where the cluster control station comprises means for connecting the cluster control station to the line control station via a line, and means for combining signals received from one or a plurality of base stations within the one cluster and sending combined signals to the line control station. According to the cluster control station of the present invention, it is possible to realize a soft handover and a site diversity process.

The cluster control station may be connected to the plurality of base stations within the one cluster via a loop network or a bus network.

Another object of the present invention is to provide a cluster control station for controlling a plurality of base stations within one cluster to which the cluster control station belongs, and operable in a mobile communication system which includes a line control station and a plurality of clusters, where the cluster control station comprises means for connecting the cluster control station to the line control station via a line, and means for sending signals received from the line control station to a plurality of base stations within the one cluster directly or via one or a plurality of other base stations within the one cluster. According to the cluster control station of the present invention, it is possible to realize a soft handover and a site diversity process.

The cluster control station may be connected to the plurality of base stations within the one cluster via a loop network or a bus network.

Still another object of the present invention is to provide a base station provided within one cluster which includes a cluster control station and a plurality of base stations, and operable in a mobile communication system which includes a line control station and a plurality of clusters, where the base station comprises means for sending signals received from a mobile station to the cluster control station within the one cluster directly or via one or a plurality of other base stations within the one cluster. According to the base station of the present invention, it is possible to carry out a distributed autonomous process.

The base station may further comprise means for connecting to the one or the plurality of other base stations within the one cluster via a loop network or a bus network.

A further object of the present invention is to provide a base station provided within one cluster which includes a cluster control station and a plurality of base stations, and operable in a mobile communication system which includes a line control station and a plurality of clusters, where the base station comprises means for receiving signals from the cluster control station within the one cluster and sending to a mobile station information included in the signals and required by the mobile station. According to the base station of the present invention, it is possible to carry out a distributed autonomous process.

The base station may further comprise means for connecting to the one or the plurality of other base stations within the one cluster via a loop network or a bus network.

Another object of the present invention is to provide a line control station operable in a mobile communication system which includes a plurality of clusters each including a plurality of base stations, where the line control station comprises means for carrying out a handover control between first and second clusters when a mobile station moves between areas of the first and second clusters.

According to the line control station of the present invention, it is possible to realize a soft handover.

In a case where each of the clusters includes a cluster control station which controls a plurality of base stations within the cluster, the means of the line control station may carry out the handover control via cluster control stations included in the first and second clusters.

Still another object of the present invention is to provide a mobile station operable in a mobile communication system which includes a plurality of clusters each including a plurality of mutually coupled base stations, where the mobile station comprises means for simultaneously receiving signals from one or a plurality of base stations within one cluster, and means for simultaneously sending signals to one or a plurality of base stations within one cluster. According to the mobile station of the present invention, it is possible to realize a site diversity process.

In a case where each of the clusters includes a cluster control station which controls the plurality of base stations within one cluster to which the cluster control station belongs, the mobile station may further comprise means for notifying the cluster control station of one or a plurality of base stations within the one cluster capable of communicating with the mobile station.

Other objects and further features of the present invention will be apparent from the following detailed description when read in conjunction with the accompanying drawings.

DESCRIPTION OF THE PREFERRED EMBODIMENTS

A description will be given of various embodiments of the present invention, by referring to FIG. 2 and subsequent drawings.

Figure 1:
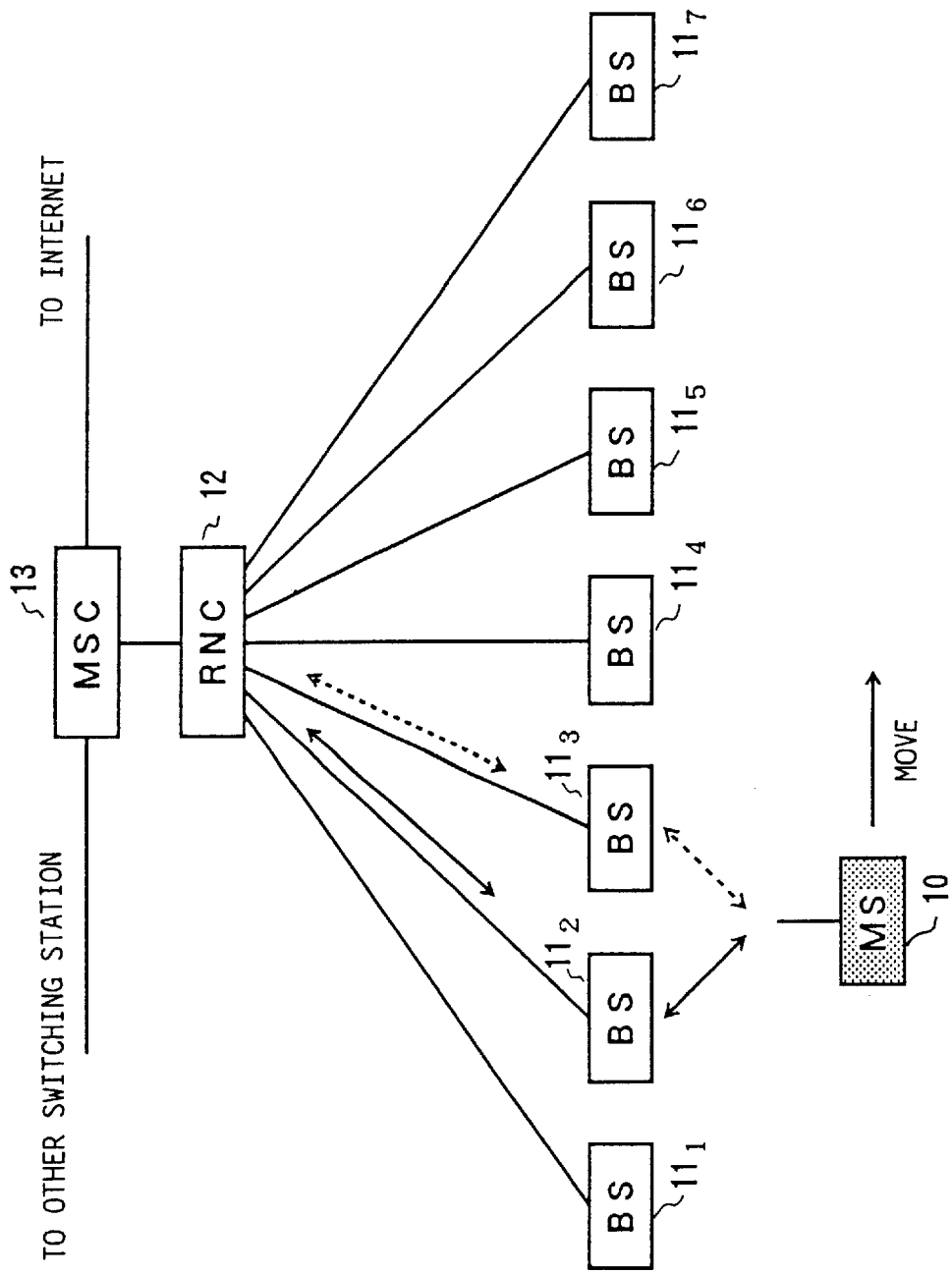
FIG. 1 is a diagram for explaining an example of a conventional mobile communication system.
Figure 2:
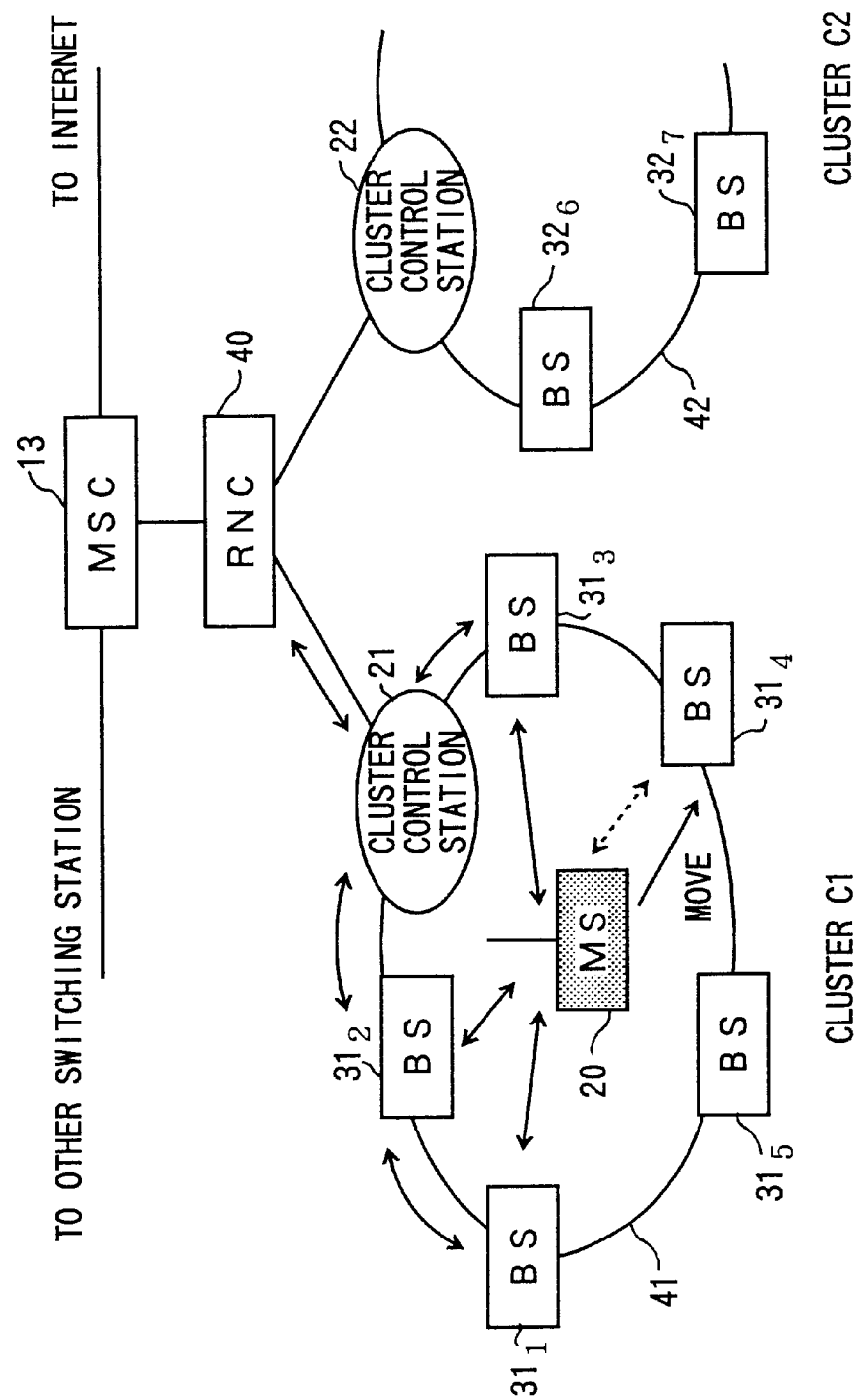
FIG. 2 is a diagram for explaining an embodiment of a cluster structured mobile communication system according to the present invention using loop type local area networks.

(1) Structure of Mobile Communication System:

An embodiment of a mobile communication system according to the present invention is shown in FIG. 2.

The mobile communication system shown in FIG. 2 includes a mobile communication switching station (MSC) 13, a line control station (RNC) 40, cluster control stations 21 and 22, a plurality of base stations $31_1$ through $31_5$ and $32_6$ through $32_7$, and local area networks (LANs) 41 and 42 which connect the cluster control stations 21 and 22 to the corresponding base stations 31 and 32.

Normally, the base stations 31 and 32 are respectively clustered for each region.

A cluster C1 includes a plurality of base stations $31_1$ through $31_5$, and the cluster control station 21 which controls the base stations $31_1$ through $31_5$. The base stations $31_1$ through $31_5$ and the cluster control station 21 are connected by lines, and the LAN 41 is formed within the cluster C1. Similarly, a cluster C2 includes a plurality of base stations $32_6$, $32_7$, ... and the cluster control station 22 which controls the base stations $32_6$, $32_7$, .... The base stations $32_6$, $31_7$, ... and the cluster control station 22 are connected by lines, and the LAN 42 is formed within the cluster C2.

The cluster control stations 21 and 22 are connected to the line control station 40 by lines.

Compared to the conventional mobile communication system, the number of stations which are directly connected under the line control station 40 is small, and only two cluster control stations 21 and 22 are directly connected to the line control station 40 in FIG. 2. Accordingly, the load on the line control station 40 and the load on the lines between the line control station 40 and the base stations 31 and 32 (that is, the cluster control stations 21 and 22) are greatly reduced.

The line control station 40 carries out a control with respect to the cluster control stations 21 and 22 of each of the clusters C1 and C2, by recognizing the entire cluster C1 or C2 as a logical base station. When a communication request is generated, the line control station 40 carries out the control such as the allocation of the radio channels used by each of the base stations 31 and 32, and the start and end of the communication. In addition, the line control station 40 carries out a handover control when a mobile station (MS) 20 moves between the clusters C1 and C2.

High-speed communication is carried out via the lines which form the LAN 41 within the cluster C1 and the LAN 42 within the cluster C2. Fixed high-speed cable lines including optical lines or, high-speed radio lines may be used for such lines forming the LANs 41 and 42.

Figure 3:
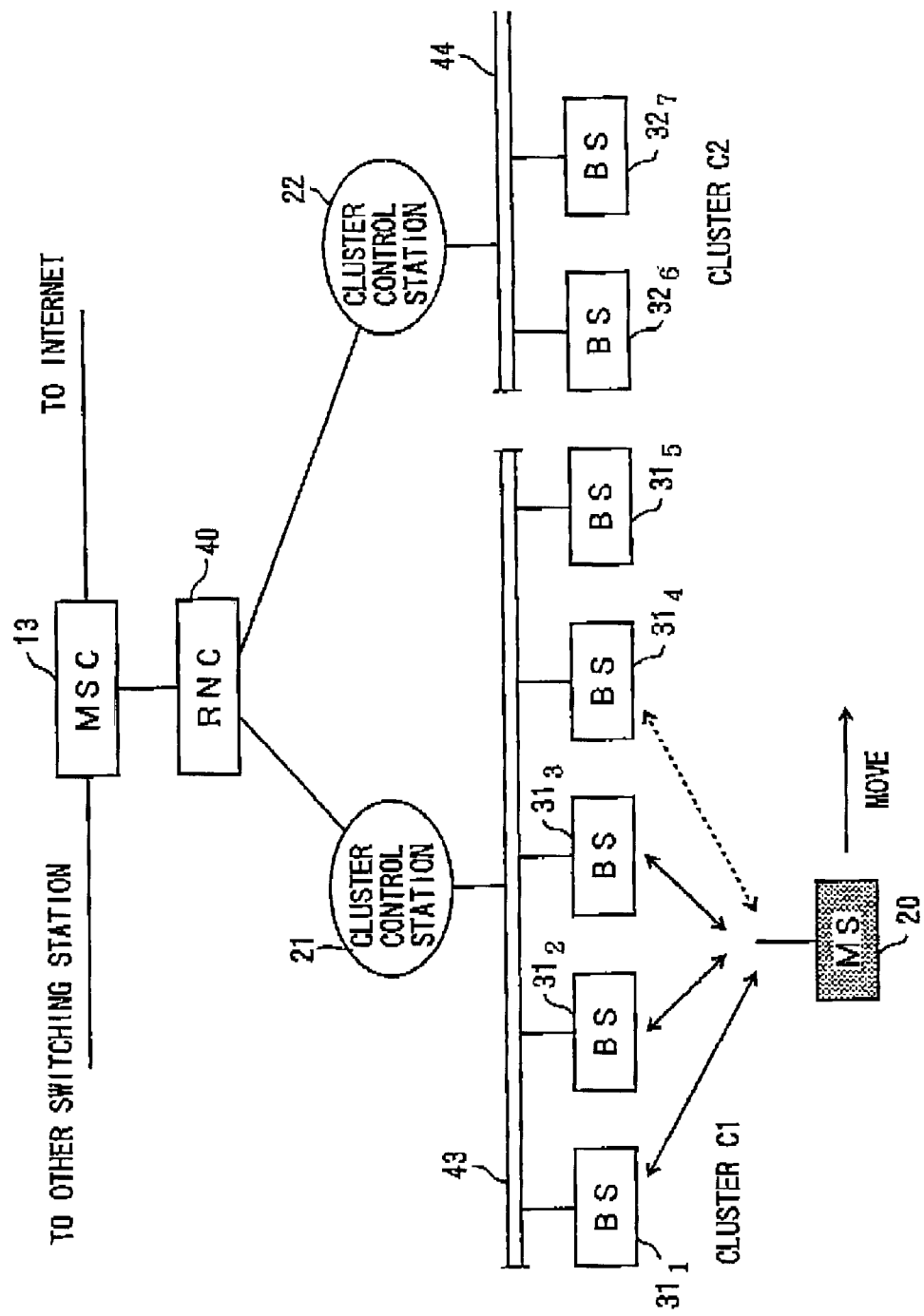
FIG. 3 is a diagram for explaining a modification of the embodiment of the cluster structured mobile communication system which uses bus type local area networks.

In place of the loop type LANs 41 and 42 shown in FIG. 2, it is also possible employ bus type LANs 43 and 44 shown in FIG. 3. FIG. 3 shows a modification of the embodiment of the mobile communication system. In FIG. 3, those parts which are the same as those corresponding parts in FIG. 2 are designated by the same reference numerals, and a description thereof will be omitted.

An exclusive protocol, a general Internet Protocol (IP) and the like may be used for the communication protocol employed in the LANs 41 and 42. In this case, for example, IP addresses are assigned to each of the base stations 31 and 32 and each of the cluster control stations 21 and 22, and information is sent in the form of IP packets. By providing a high-speed router or a Layer-3 switch in each of the base stations 31 and 32 and each of the cluster control stations 21 and 22, it is possible to obtain the required information transfer rate. When sending the same information from the cluster control stations 21 and 22 to the plurality of base stations 31 and 32, it is efficient to employ the IP multicast functions. In addition, in the case of the loop type LAN 41 or 42 shown in FIG. 2, the information can be sent using a backward route in the case of the IP, even if a disconnection occurs at a line, thereby making it possible to realize a LAN structure having a high reliability.

The line speed of the lines connecting the line control station 40 and the cluster control stations 21 and 22 may be slower than that of the lines forming the LANs 41 and 42.

A line may be provided to mutually connect the clusters C1 and C2. In other words, a line may be provided to connect the cluster control station 21 and the cluster control station 22. In this case, the information which is exchanged when communicating between the mobile stations 20 may be transferred directly between the cluster control stations 21 and 22, without transferring the information via the line control station 40.

Therefore, it is possible to reduce the load on the line control station 40 and the load on the line between the line control station 40 and the base stations 31 and 32 (that is, the cluster control stations 21 and 22).

(2) Operation of Mobile Communication System

Next, a description will be given of the operation of the mobile communication system shown in FIG. 2.

The line control station 40 and the mobile communication switching station 13 are connected via a line, and the handover between the clusters C1 and C2 is made via the line control station 40.

The cluster control stations 21 and 22 distribute the signals from the line control station 40 to each of the base stations 31 and 32. In addition, the cluster control stations 21 and 22 combine and send to the line control station 40 up-signals from the same mobile station 20 and received via the base stations 31 and 32.

Each of the base stations 31 and 32 only receives down-signals which are required or addressed thereto, and received from the cluster control stations 21 and 22 or other base stations. In addition, depending on the instruction from the cluster control stations 21 and 22, the signal content and the like, each of the base stations 31 and 32 relays the received signals to other base stations.

When communicating with the mobile station 20, the radio signals are simultaneously exchanged between the mobile station 20 and a plurality of base stations 31 or 32 which are located near the mobile station 20. In the case shown in FIG. 2, the radio signals are simultaneously exchanged between the mobile station 20 and the base stations 311, 312 and 313 which are located near the mobile station 20.

Furthermore, when the mobile station 20 moves in the direction of the base station 314 as shown in FIG. 2, the radio signals are then simultaneously exchanged between the mobile station 20 and the base stations 312, 313 and 314 which are located near the new position of the mobile station 20.

Accordingly, when the mobile station 20 moves within the same cluster C1, for example, only the base stations 31 which communicate with the mobile station 20 change, and when viewed from the line control station 40, the mobile station 20 remains under the control of the cluster control station 21. The signal flow will be described hereunder in more detail.

(2-1) Up-Signals

The signals sent from the mobile station 20 are received by the plurality of the base stations $31_1$, $31_2$ and $31_3$ which are located near the mobile station 20. The signals received by the base stations $31_1$, $31_2$ and $31_3$ are sent to the cluster control station 21 via the lines (LAN 41) which connect the base stations 31 and the cluster control station 21. The cluster control station 21 subjects the up-signals which are received by the base stations $31_1$, $31_2$ and $31_3$ to a diversity combining process.

The diversity combining process may be carried out according to various methods, such as the methods ① and ② described below.

According to the method ①, a soft decision signal which is received and detected by the base station is sent to the cluster control station together with the received signal intensity (RSSI) or the signal-to-noise and interference total power ratio (S/N+I), and the cluster control station combines the signals received by the base stations with a maximal ratio combining. Although the amount of information sent between the cluster control station and the base station is large, maximum diversity effects are obtainable.

According to the method ②, bit information demodulated in the base stations is sent to the cluster control station, and the cluster control station combines the bit information in units of error correction words using parity information. Although the diversity effects are not as large as those obtainable according to the method ①, the amount of information sent between the cluster control station and the base stations is smaller.

The received information which is combined and subjected to the error correction process is sent to the mobile communication switching station 13 directly or, via the line control station 40. The information to the party at the other end is sent from the mobile communication switching station 13 via a fixed network, Internet or the like.

(2-2) Down-Signals

The down-signals are sent from the mobile communication switching station 13 to the cluster control station 21 which belongs to the cluster C1 in which the mobile station 20 presently exists, directly or, via the line control station 40 under which the cluster C1 is connected. The cluster control station 21 uses the LAN 41 within the cluster C1, and sends the down-signals to each of the base stations $31_1$ through $31_5$ within the cluster C1. Each of the base stations $31_1$ through $31_5$ sends the down-signals to the mobile station 20 according to one of the following two methods, for example.

According to a first method, the down-signals are sent from all of the base stations $31_1$ through $31_5$ within the cluster C1 to the mobile station 20, and the down-signals are combined in the mobile station 20.

Although this first method also sends the down-signals from the base stations $31_4$ and $31_5$ which are not located close to the mobile station 20 and cause interference among the base stations $31_1$ through $31_5$, the required control is simple. Hence, this first method is suited for a case where common information is to be sent to all of the base stations $31_1$ through $31_5$ within the same cluster C1.

On the other hand, according to a second method, the down-signals are sent from only the base stations $31_1$ through $31_3$ from which the mobile station 20 can receive the down-signals, and the down-signals are combined in the mobile station 20.

In other words, the mobile station 20 measures the received signal intensity (RSSI) or the signal-to-noise and interference total power ratio (S/N+I) of the signals received from each of the base stations $31_1$ through $31_5$ within the cluster C1. From the measured results, the mobile station 20 specifies one or more base stations which can communicate with the mobile station 20, and inserts information indicating the specified base stations to control signals within the up-signals. The up-signals including the control signals are sent via the specified base stations to the cluster control station 21, to thereby register the specified base stations in the cluster control station 21. The cluster control station 21 determines the base stations to which the down-signals are to be sent, based on the registered specified base stations, and sends the down-signals to the determined base stations by specifying the determined base stations. The specified base stations which receive the down-signals from the cluster control station 21 send the received down-signals to the mobile station 20.

According to this second method, the required control is slightly more complicated than the first method, but unnecessary signal exchanges are reduced, and the interference among the base stations is reduced compared to the first method. Therefore, this second method is suited for a case where an independent communication is to be made the mobile station 20.

When the IP is used for the protocol of the LANs 41 and 42 within the respective clusters C1 and C2 in order to carry out the above described control, a Dynamic Host Configuration Protocol (DHCP) server may be provided within each of the cluster control stations 21 and 22, for example. Based on the information indicating the registered specified base stations, each DHCP server can assign the IP addresses of the specified base stations to the mobile station 20. Hence, each of the base stations 31 and 32 in this case function as a host which logically accommodates the mobile station 20.

Various access systems or techniques may be used to multiplex and demultiplex the down-signals exchanged on the radio line.

For example, when the CDMA is used as the access system, the signals may be sent from the base stations at the same frequency by using different spread codes for each of the base stations. In this case, the mobile station 20 uses a number of spread codes corresponding to the base stations, and despreads the signals received from the base stations. The despread signals are demultiplexed, so as to detect the received soft decision signal, and the soft decision signal is used to carry out the maximal ratio combining process.

In a case where the radio transmission rate is high, the signals may be sent from each of the base stations using a common spread code. In this case, the mobile station 20 uses propagation delay time differences between the mobile station 20 and the base stations to make a RAKE reception, so as to obtain the diversity effects.

Further, when the TDMA is used as the access system, the signals may be sent from the base stations using different time slots for each of the base stations. In this case, the mobile station 20 demultiplexes the signals of the different slots from each of the base stations, so as to detect the received soft decision signal, and the soft decision signal is used to carry out the maximal ratio combining process.

(2-3) Handover Between Clusters

As described above, when the mobile station 20 moves within the cluster C1, for example, the handover is carried out by the process within the cluster C1. However, the handover between the clusters C1 and C2 cannot be processed within the cluster C1 or C2, and is carried out via the line control station 40.

In FIG. 2, when the mobile station 20 moves from the area of the cluster C1 to the area of the cluster C2, the mobile station 20 measures the received signal intensity (RSSI) or the signal-to-noise and interference total power ratio (S/N+I) of the signals received from each of the base stations $32_6$, $32_7$, . . . within the cluster C2. From the measured results, the mobile station 20 specifies one or more base stations which can communicate with the mobile station 20, and inserts information indicating the specified base stations to the control signals within the up-signals. The up-signals including the control signals are sent via the specified base stations to the cluster control station 22 of the cluster C2, the thereby register the specified base stations in the cluster control station 22. The cluster control station 22 which receives the information inserted in the control signals within the received up-signals notifies the line control station 40 that the registration of the specified base stations are made with respect to the mobile station 20.

In addition, the cluster control station 22 determines the base stations 32 which are included in the cluster C2 and to which the down-signals are to be sent. The cluster control station 22 specifies the determined base stations 32, and sends the down-signals thereto. Thereafter, the line control station 40 exchanges the signals related to the mobile station 20 with the cluster control station 22 in the cluster C2. In the case of the CDMA mobile communication system, it is of course possible to carry out a diversity handover between the base station 31 of the cluster C1 and the base station 32 of the cluster C2, similarly to the diversity handover carried out between the base stations in the conventional mobile communication system.

Therefore, according to this embodiment of the mobile communication system, the mobile station can constantly receive signals from a plurality of base stations, and excellent site diversity transmission effects with respect to the mobile station can be expected. In addition, a plurality of base stations can simultaneously receive signals from one mobile station, and excellent site diversity reception effects with respect to the base stations can be expected. Hence, it is possible to transmit and receive high-quality signals according to this embodiment. Moreover, for a given signal quality, this embodiment enables communication over a wider range as compared to the conventional mobile communication system.

If the mobile station moves within the area of one cluster, a suitable site diversity process can be carried out within the cluster independently of the line control station, thereby reducing the load on the line control station. In addition, the amount of information exchanged between the base station and the line control station is small, such that the capacity of the line connecting the base station and the line control station can be reduced compared to that of the conventional mobile communication system.

Furthermore, when the mobile station moves within the area of one cluster, a soft handover can be carried out within the cluster, because the base stations communicating with the mobile station before the handover do not change in their entirety after the handover and one or more base stations communicating before the handover continue to communicate with the mobile station after the handover. Hence, it is possible to realize a high-quality mobile communication while reducing the load on the line control station and reducing the load on the line between the line control station and the base station (cluster control station), as compared to the conventional mobile communication system.

(3) Structure and Operation of Cluster Control Station

A description will be given of the structure and operation of the cluster control stations 21 and 22.

The cluster control stations 21 and 22 have the same construction, and thus, a description will hereunder be given of the cluster control station 21. The cluster control station 21 distributes the signals from the line control station 40 to each of the base stations 31 within the cluster C1 to which the cluster control station 21 belongs. In addition, the cluster control station 21 combines the up-signals which originate from one mobile station 20 and are received via the base stations 31, and sends the combined signal to the line control station 40.

Figure 4:
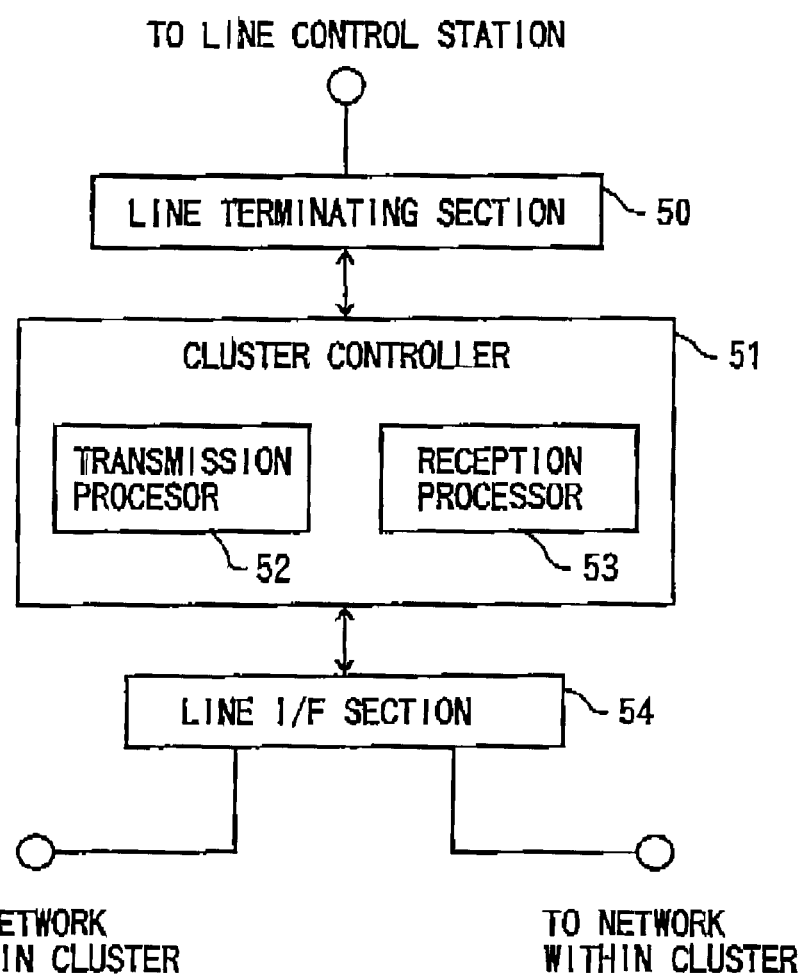
FIG. 4 is a system block diagram for explaining an embodiment of a cluster control station according to the present invention.

FIG. 4 is a system block diagram showing the structure of an embodiment of the cluster control station according to the present invention.

The cluster control station 21 shown in FIG. 4 includes a line terminating section 50, a controller 51, and a line interface (I/F) section 54. The controller 51 includes a transmission processor 52 and a reception processor 53.

In FIG. 4, the down-signals from the line control station 40 are supplied to the controller 51 via the line terminating section 50. In a case where the down-signals received from the line control station 40 are to be sent from the base stations 31 to the mobile station 20, the controller 51 specifies with respect to the transmission processor 52 the base stations 31 to which the down-signals are to be sent and the transmission scheme and the multiplexing scheme to be employed when sending the down-signals from the base station 31. The controller 51 sends the down-signals from the transmission processor 52 to the specified base stations 31 via the line interface section 54.

On the other hand, the up-signals from the base stations 31 are received by the line interface section 54, and are subjected to a diversity combining process and an error correction process in the reception processor 53 of the controller 51. The up-signals which are processed in the reception processor 53 are sent via the line terminating section 50 to the mobile communication switching station 13 directly or, via the line control station 40. If the error within the received up-signals cannot be corrected by the processes of the reception processor 53, the up-signals are discarded in units such as code words, frames and packets or, an Automatic Request (ARQ) process is carried out with respect to the up-signals in the reception processor 53.

When the IP is used as the protocol of the LAN 41 within the cluster C1, the line interface section 54 uses an IP router or a Layer-3 switch. In addition, a DHCP server may be provided in the controller 51. In this case, based on the information indicating the registered specified base stations 31, the DHCP server can assign the IP addresses of the specified base stations 31 to the mobile station 20. Hence, each of the base stations 31 in this case functions as a host which logically accommodates the mobile station 20.

This embodiment of the cluster control station controls the base stations within the cluster to which the cluster control station belongs, so that processes which can be carried out within the cluster are carried out within the cluster. As a result, the load on the line control station and the mobile communication switching station is effectively reduced.

In addition, the cluster control station exchanges signals with the base stations that enable each base station to carry out a distributed autonomous process.

(4) Structure and Operation of Base Station

Each of the base stations 31 and 32 relays and sends to other base stations the signals which are received from other base stations or the cluster control station 21 or 22. Each of the base stations 31 and 32 receives the signals addressed thereto or the signals required therein. In addition, each of the base stations 31 and 32 capable of communicating with the mobile station 20 basically communicates with the mobile station 20. Various access systems such as the CDMA, TDMA and FDMA may be employed for the communication between each of the base stations 31 and 32 and the mobile station 20.

Figure 5:
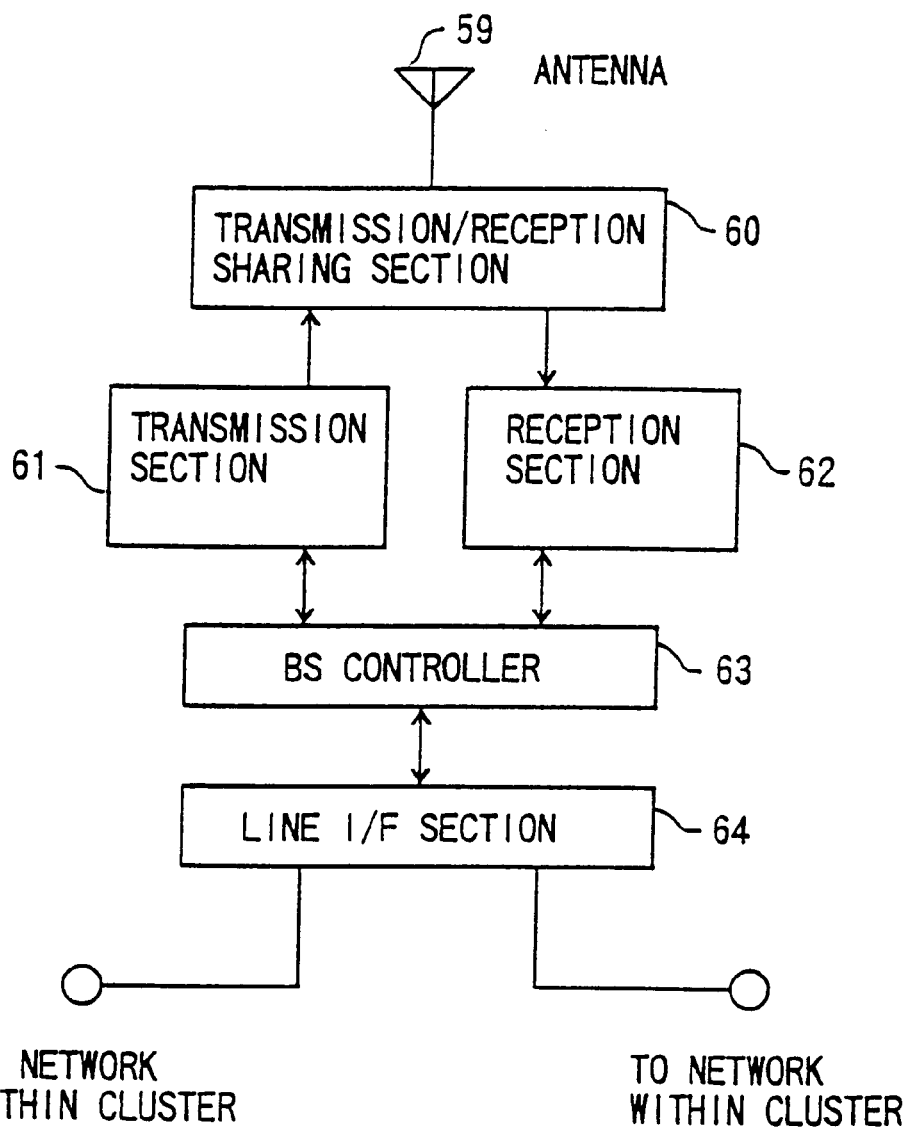
FIG. 5 is a system block diagram for explaining an embodiment of a base station according to the present invention.

The base stations 31 and 32 have the same construction, and thus, a description will hereunder be given of the base station 31. FIG. 5 is a system block diagram showing the structure of an embodiment of the base station according to the present invention.

The base station 31 shown in FIG. 5 includes an antenna 59, a transmission and reception sharing section 60, a transmission section 61, a reception section 62, a base station (BS) controller 63, and a line interface (I/F) section 64.

In FIG. 5, the down-signals from the cluster control station 21 are received by the line interface section 64, and the BS controller 63 judges whether or not the received down-signals are to be sent from the base station 31 to which the BS controller 63 belongs. The BS controller 63 also recognizes the transmission scheme and the multiplexing scheme to be employed when sending the down-signals from this base station 31. When the BS controller 63 judges that the received down-signals are to be sent from this base station 31, the transmission section 61 encodes the down-signals according to a predetermined air interface, and the encoded down-signals are sent via the transmission and reception sharing section 60 and the antenna 59.

On the other hand, the up-signals received from the mobile station 20 are detected by the reception section 62 via the antenna 59 and the transmission and reception sharing section 60. The reception section 62 includes in the detected up-signals the information which is required in the cluster control station 21 in order to carry out the diversity combining process, such as the received signal intensity (RSSI) and the signal-to-noise and interference total power ratio (SIN+I) of the detected up-signals. The detected up-signals, including the above information, are sent to the cluster control station 21 via the line interface section 64.

When the IP is used as the protocol of the LAN 41 within the cluster C1, a portion of the line interface section 64 and the BS controller 63 is formed by an IP router or a Layer-3 switch.

Therefore, this embodiment of the base station can carry out the distributed autonomous process.

(5) Operation of Line Control Station

In an embodiment of the line control station according to the present invention, when a communication request is generated, the line control station 40 controls the allocation of radio channels used by the base stations 31 and 32, the start and end of the communication, and the like. In addition, the line control station 40 carries out a handover control when the mobile station 20 moves between the areas of the clusters C1 and C2.

(6) Structure and Operation of Mobile Station

A description will be given of the structure and operation of the mobile station 20.

Basically, the mobile station 20 exchanges signals with all base stations 31 and 32 which are capable of communicating with the mobile station 20. In addition, the mobile station 20 simultaneously receives signals from a plurality of base stations 31 and/or 32, and simultaneously sends signals to a plurality of base stations 31 and/or 32. Channels which are used to exchange the signals between the mobile station 20 and the plurality of base stations 31 and/or 32 may be the same or different. In addition, the signals from the plurality of base stations 31 and/or 32 may be combined and received by the mobile station 20 or, the best signal of the signals received from the plurality of base stations 31 and/or 32 may be selected and received by the mobile station 20. The signals sent from the mobile station 20 to the plurality of base stations 31 and/or 32 may be the same or, different for each of the base stations 31 and 32.

Figure 6:
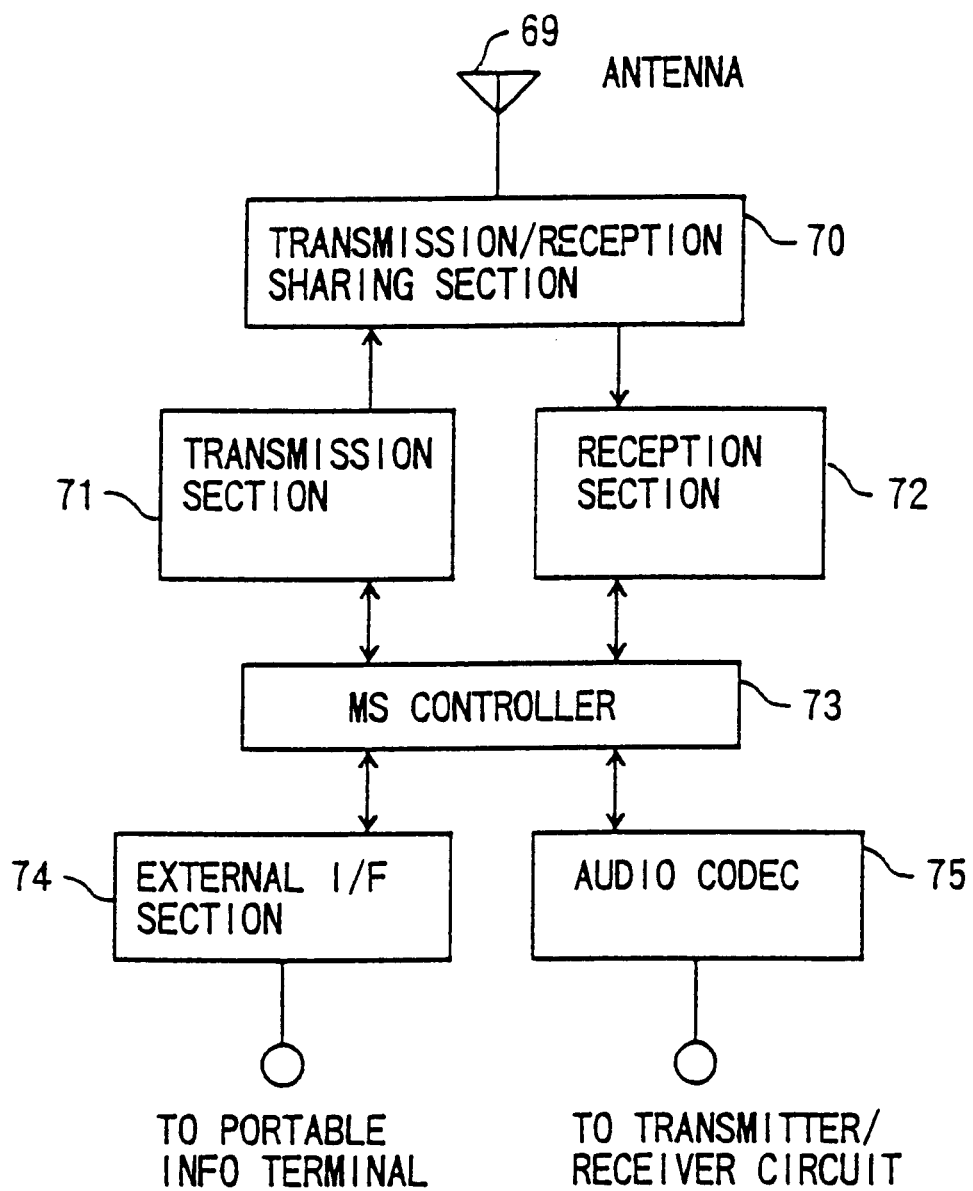
FIG. 6 is a system block diagram for explaining an embodiment of a mobile station according to the present invention.

FIG. 6 is a system block diagram showing the structure of an embodiment of the mobile station according to the present invention.

The mobile station 20 shown in FIG. 6 includes an antenna 69, a transmission and reception sharing section 70, a transmission section 71, a reception section 72, a mobile station (MS) controller 73, an external interface (I/F) section 74, and an audio CODEC 75.

In FIG. 6, the down-signals from the base stations 31 and/or 32 are received by the reception section 72 via the antenna 69 and the transmission and reception sharing section 70. The reception section 72 demultiplexes the down-signals from the base stations 31 and/or 32, and carries out a diversity combining process.

For example, when the CDMA is employed as the access system, the base stations 31 and/or 32 send the down-signals at the same frequency using spread codes which are different for each of the base stations 31 and/or 32. In this case, the mobile station 20 despreads the down-signals from the base stations 31 and/or 32 using spread codes corresponding to the base stations 31 and/or 32. The despread signals from each of the base stations 31 and/or 32 are demultiplexed, so as to detect the received soft decision signal, and the soft decision signal is used to carry out a maximal ratio combining process.

In the case where the radio transmission rate is high, the signals may be sent from each of the base stations 31 and/or 32 using a common spread code. In this case, the mobile station 20 uses propagation delay time differences between the mobile station 20 and the base stations 31 and/or 32 to make a RAKE reception, so as to obtain the diversity effects.

Further, when the TDMA is used as the access system, the signals may be sent from the base stations 31 and/or 32 using different time slots for each of the base stations 31 and/or 32. In this case, the mobile station 20 demultiplexes the signals of the different slots from each of the base stations 31 and/or 32, so as to detect the received soft decision signal, and the soft decision signal is used to carry out the maximal ratio combining process.

The MS controller 73 carries out necessary processes by confirming the contents of the down-signals after the diversity combining process and the error correction process. For example, if the down-signals are audio signals, the MS controller 73 carries out the necessary process to start the audio CODEC 75, converts the audio signals into signals suited for outputting sound from a transmitter-receiver circuit (not shown) within the mobile station 20, and outputs the signals to the transmitter-receiver circuit via the audio CODEC 75. In addition, if the down-signals are data signals to be sent to a portable information terminal (not shown) which is coupled to the mobile station 20, the MS controller 73 carries out the necessary process to output the data signals to the portable information terminal via the external interface section 74.

The MS controller 73 also encodes the up-signals to be sent from the mobile station 20 to the base stations 31 and/or 32 according to a predetermined air interface, and sends the up-signals to the base stations 31 and/or 32 via the transmission section 71, and the transmission and reception sharing section 70 and the antenna 69.

The reception section 72 of the mobile station 20 measures the received signal intensity (RSSI) or the signal-to-noise and interference total power ratio (S/N+I) of the signals received from each of the base stations 31 within the cluster C1 and/or the base stations 32 within the cluster C1. From the measured results, the MS controller 73 of the mobile station 20 specifies one or more base stations 31 and/or 32 which can communicate with the mobile station 20, and inserts information indicating the specified base stations 31 and/or 32 to the control signals within the up-signals. The up-signals including the above control signals are sent from the transmission section 71 via the specified base stations 31 and/or 32 to the cluster control station 21 of the cluster C1 and/or the cluster control station 22 of the cluster C2, to thereby register the specified base stations 31 and/or 32 in the corresponding cluster control stations 21 and/or 22.

Therefore, this embodiment of the mobile station can simultaneously receive the signals from one or a plurality of base stations within the same cluster, and to simultaneously send signals to the one or plurality of base stations within the same cluster. Hence, it is possible to carry out the soft handover process and the suitable site diversity process.

In the embodiments described above, the cluster control stations are independent of the base stations. However, the cluster control station may include the functions of the base station. In other words, the functions of the cluster control station may be included within one of the base stations belonging to the same cluster.

According to the present invention, it is possible to reduce the load on the line control station, and to realize an efficient network for the mobile communication system. In addition, because the soft handover process can be carried out easily and efficiently, the communication quality between the mobile station and the base stations is improved, and it is also possible to improve the area coverage of the mobile communication system.

Further, the present invention is not limited to these embodiments, but various variations and modifications may be made without departing from the scope of the present invention.

What is claimed is:

1. A mobile communication system comprising:
   a line control station; and
   a plurality of base stations belonging to a plurality of clusters so that each of the clusters includes a plurality of base stations,
   each of the clusters including a cluster control station which is connected to said line control station via a line and controls the base stations within the cluster to which the cluster control station belongs, said cluster control station including means for sending signals received from the line control station to a plurality of base stations within said one cluster directly or via one or a plurality of other base stations within said one cluster,
   each of the base stations within one cluster being connected to other base stations within said one cluster and/or the cluster control station within said one cluster via lines, so that each of the base stations within said one cluster is directly or indirectly connected to the cluster control station within said one cluster,
   wherein said base stations simultaneously send signals with respect to a single mobile station to said cluster control station, and
   said cluster control station comprises:
      means for assigning IP addresses of registered specified base stations to a mobile station based on information indicating the specified base stations; and
      means for combining the signals into a combined signal with respect to a single mobile station from said base stations and sending the combined signal to the line control station.

2. The mobile communication system as claimed in claim 1, wherein connections within each of the clusters are made by high-speed cable lines or high-speed radio lines.

3. The mobile communication system as claimed in claim 1, wherein the cluster control station and each of the base stations within a single cluster are connected via a loop network or a bus network.

4. The mobile communication system as claimed in claim 1, wherein Internet Protocol (IP) is used as a communication protocol on the lines within each of the clusters.

5. The mobile communication system as claimed in claim 1, wherein a plurality of said base stations simultaneously receive signals sent from a single mobile station.

6. The mobile communication system as claimed in claim 1, wherein the plurality of clusters are mutually connected via lines.

7. The mobile communication system as claimed in claim 6, wherein said line control station connects corresponding cluster control stations within the plurality of clusters via the lines.

8. The mobile communication system as claimed in claim 1, wherein the cluster control station for controlling a plurality of base stations within one cluster to which the cluster control station belongs comprises:

means for connecting the cluster control station to the line control station via a line;

means for sending signals received from the line control station to a plurality of base stations within said one cluster directly or via one or a plurality of other base stations within said one cluster; and means for combining signals received from a plurality of base stations within said one cluster and sending combined signals to the line control station.

9. The mobile communication system as claimed in claim 8, wherein said cluster control station is connected to the plurality of base stations within said one cluster via a loop network or a bus network.

10. The mobile communication system as claimed in claim 1, wherein the base station provided within one cluster which includes a cluster control station and a plurality of base station comprises:

means for receiving signals from said cluster control station within said one cluster directly or via one or a plurality of other base stations within said one cluster; and means for sending signals received from a mobile station to the cluster control station within said one cluster directly or via one or a plurality of other base stations within said one cluster.

11. The mobile communication system as claimed in claim 10, further comprising:

means for connecting to one or a plurality of other base stations within said one cluster via a loop network or a bus network.

12. The mobile communication system as claimed in claim 1, wherein the base station provided within one cluster which includes a cluster control station and a plurality of base stations comprises:

means for receiving signals from the cluster control station within said one cluster directly or via one or a plurality of other base stations within said one cluster, and sending to a mobile station information included in the signals and required by the mobile station.

13. The mobile communication system as claimed in claim 12, wherein the base station comprises means for connecting one or a plurality of other base stations within said one cluster via a loop network or a bus network.

14. The mobile communication system as claimed in claim 1, wherein said line control station comprises:

means for carrying out a handover between first and second clusters when a mobile station moves between areas of the first and second clusters, each of the clusters including a cluster control station which controls a plurality of base stations within one cluster, said cluster control station including means for sending signals received from the line control station to a plurality of base stations within said one cluster directly or via one or a plurality of other base stations within said one cluster.

15. The mobile communication system as claimed in claim 14, wherein said means for carrying out the handover control carries out the handover control via cluster control stations included in the first and second clusters.

16. A mobile communication system comprising:

a line control station; and a plurality of base stations belonging to a plurality of clusters so that each of the clusters includes a plurality of base stations, each of the clusters including a cluster control station which is connected to said line control station via a line and controls the base stations within the cluster to which the cluster control station belongs, said cluster control station including a signal transmission mechanism configured to send signals received from the line control station to a plurality of base stations within said one cluster directly or via one or a plurality of other base stations within said one cluster, each of the base stations within one cluster being connected to other base stations within said one cluster and/or the cluster control station within said one cluster via lines, so that each of the base stations within said one cluster is directly or indirectly connected to the cluster control station within said one cluster, wherein said base stations simultaneously send signals with respect to a single mobile station to said cluster control station, and said cluster control station comprises:

an address assignment mechanism configured to assign IP addresses of registered specified base stations to a mobile station based on information indicating the specified base stations; and a signal combiner configured to combine the signals into a combined signal with respect to a single mobile station from said base stations and sending the combined signal to the line control station.

17. The mobile communication system as claimed in claim 16, wherein the cluster control station for controlling a plurality of base stations within one cluster to which the cluster control station belongs comprises:

a signal transmission line that connects the cluster control station to the line control station;

the signal transmission mechanism; and a base station signal combiner configured to combine signals received from a plurality of base stations within said one cluster and sending combined signals to the line control station.

18. The mobile communication system as claimed in claim 16, wherein the base station provided within one cluster which includes a cluster control station and a plurality of base station comprises:

a receiver configured to receive signals from said cluster control station within said one cluster directly or via one or a plurality of other base stations within said one cluster; and a transmitter configured to send signals received from a mobile station to the cluster control station within said one cluster directly or via one or a plurality of other base stations within said one cluster.

19. The mobile communication system as claimed in claim 16, wherein the base station provided within one cluster which includes a cluster control station and a plurality of base stations comprises:

a transceiver configured to receive signals from the cluster control station within said one cluster directly or via one or a plurality of other base stations within said one cluster, and send to a mobile station information included in the signals and required by the mobile station.

20. The mobile communication system as claimed in claim 16, wherein said line control station comprises:
a controller configured to perform a handover between first and second clusters when a mobile station moves between areas of the first and second clusters, each of the clusters including a cluster control station which controls a plurality of base stations within one cluster,
said cluster control station including a transmitter configured to transmit signals received from the line control station to a plurality of base stations within said one cluster directly or via one or a plurality of other base stations within said one cluster.

* * * * *